(12) United States Patent
Choi et al.

(10) Patent No.: US 9,336,412 B2
(45) Date of Patent: May 10, 2016

(54) STORAGE SYSTEM AND METHOD FOR CONTROLLING STORAGE SYSTEM

(71) Applicant: HITACHI, LTD., Tokyo (JP)

(72) Inventors: Jin Choi, Tokyo (JP); Shinichi Nakayama, Tokyo (JP); Tetsuya Shirogane, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/426,406

(22) PCT Filed: Dec. 12, 2013

(86) PCT No.: PCT/JP2013/083335
§ 371 (c)(1),
(2) Date: Mar. 6, 2015

(87) PCT Pub. No.: WO2015/087426
PCT Pub. Date: Jun. 18, 2015

(65) Prior Publication Data
US 2016/0034719 A1 Feb. 4, 2016

(51) Int. Cl.
*G06F 21/00* (2013.01)
*G06F 21/62* (2013.01)
(Continued)

(52) U.S. Cl.
CPC ............ *G06F 21/78* (2013.01); *G06F 12/1408* (2013.01); *H04L 9/0894* (2013.01); *G06F 3/067* (2013.01); *G06F 11/076* (2013.01);
(Continued)

(58) Field of Classification Search
CPC .............. G06F 11/1076; G06F 3/067; G06F 2211/1028; G06F 21/6218; G06F 21/64; G06F 11/07–11/08

USPC ........ 713/165, 189, 193; 714/6.24, 6.23, 766, 714/6.3; 711/114, 103, 154
See application file for complete search history.

(56) References Cited

U.S. PATENT DOCUMENTS

| 2007/0226412 A1 | 9/2007 | Morino et al. |
| 2008/0226080 A1 | 9/2008 | Li |

(Continued)

FOREIGN PATENT DOCUMENTS

| JP | 2000286839 A | 10/2000 |
| JP | 2002082837 A | 3/2002 |

(Continued)

OTHER PUBLICATIONS

Masud Mansuripur, "Enumerative modulation coding with arbitrary constraints and postmodulation error correction coding for data storage systems", Proc. SPIE 1499, Optical Data Storage '91, 72 (Jul. 1, 1991).*

*Primary Examiner* — Alexander Lagor
(74) *Attorney, Agent, or Firm* — Volpe and Koenig, P.C.

(57) ABSTRACT

The storage system according to the present invention has a function to encrypt write data from the host and store the same in a storage media. Further, validation information of write data is added to the write data during storage thereof, and the data having the validation information added thereto is encrypted and stored in the storage media. When starting the storage system or restoring the encryption key information, the encrypted data stored in the storage media is read from the disk and decrypted prior to receiving a data access request from the host, and validation of data is performed using the validation information added to the decrypted data, so as to determine whether the encryption key stored in a storage controller is valid or not.

13 Claims, 8 Drawing Sheets

(51) Int. Cl.
  *G06F 21/78* (2013.01)
  *G06F 12/14* (2006.01)
  *H04L 9/08* (2006.01)
  G06F 11/07 (2006.01)
  G06F 3/06 (2006.01)
  G06F 21/64 (2013.01)

(52) U.S. Cl.
  CPC ............ *G06F21/6218* (2013.01); *G06F 21/64* (2013.01); *G06F 2211/1028* (2013.01); *G06F 2212/1052* (2013.01); *G06F 2212/402* (2013.01)

(56) References Cited

U.S. PATENT DOCUMENTS

2009/0019245 A1* 1/2009 Bondurant ........ G06F 17/30067 711/161
2010/0149684 A1* 6/2010 Kojima ................ G11B 19/041 360/77.04
2011/0307758 A1* 12/2011 Fillingim ............ G06F 11/1048 714/758
2012/0185437 A1* 7/2012 Pavlov .............. G06F 17/30094 707/652
2012/0303970 A1 11/2012 Koike et al.

FOREIGN PATENT DOCUMENTS

| JP | 2007219802 A | 8/2007 |
| JP | 2008236089 A | 10/2008 |
| JP | 2010211145 A | 9/2010 |
| JP | 2012243381 A | 12/2012 |

* cited by examiner

Fig.2

| LUN | HDD# | RAID LEVEL | ENCRYPTION ATTRIBUTE |
|---|---|---|---|
| 0 | 0,1,2,3 | 5 | 0 |
| 1 | 4,5,6,7 | 4 | 1 |
| 2 | 0x10,0x11, 0x12,0x13, 0x14,0x15, 0x16,0x17 | 6 | 0 |
| ... | ... | ... | ... |

201 202 203 204

200

STORAGE SYSTEM AND METHOD FOR CONTROLLING STORAGE SYSTEM

TECHNICAL FIELD

The present invention relates to storage systems, and more specifically, relates to storage systems having a storage data encryption function.

BACKGROUND ART

A storage system having an encryption function is used to protect the secrecy of data. Storage systems having an encryption function encrypt the write data sent from a higher-level device such as a host computer, and save the same in a storage device. Encryption is generally performed using a data encryption key. If the encryption key is changed incorrectly due to failure or the like, encrypted data cannot be decrypted, so that the data is actually equivalent to being lost.

Patent Literature 1 discloses a disk drive for encrypting and storing data, and in the disk drive, only the latest encryption key used currently is saved in an internal memory, and during write operation, data including a key generation information of the encryption key is written in the disk. During the read operation, the key generation information included in the data is checked, and if the key generation information is the latest information, the data is decrypted using the encryption key saved in the memory of the storage device.

CITATION LIST

Patent Literature

[PTL 1] Japanese Patent Application Laid-Open Publication No. 2012-243381

SUMMARY OF INVENTION

Technical Problem

According to the art taught in Patent Literature 1, the generation of a key is confirmed, but the validity of the key itself (whether the key information is damaged or not) is not confirmed. Therefore, if the key information stored in the storage device has become invalid due to causes such as unexpected failure or malfunction of firmware of the storage system, encryption—decryption will be performed using an invalid key, so that reading and writing of correct data cannot be performed, but the prior art lacks to correspond to such failure.

Further, there is a method for recovering the key information by having an encryption key stored (backed up) in a separate management server from the storage system, and when the key information is lost from the storage system, acquiring (restoring) the encryption key from the management server, but according to such method, it is possible that an invalid key (key that differs from the key used for encrypting the data stored in the storage system) is restored by erroneous operation of a user or administrator performing the restoration processing. In that case, there is no mechanism for confirming whether valid key information has been restored or not, so that as a result of performing restoration of the encryption key, data may not be correctly encrypted or decrypted.

The object of the present invention is to enable validation of the validity of the key information in a storage system storing encrypted data.

Solution to Problem

In order to solve the above problem, the storage system according to the present invention creates an encrypted information including data and validation information of the data while storing write data sent from a host, and stores the encrypted information in a storage media. Prior to receiving a data access request from the host, the system reads the encrypted information stored in the storage media and validates the validation information, so as to confirm that a correct key is stored in the controller.

Further, according to a preferred embodiment of the present invention, encryption information is read from the storage media during starting of the storage system or during restoration of the key information, and the encrypted information is decrypted using the encryption key stored in the storage controller, to thereby extract the data and the validation information of the data. Then, the validation information is re-computed based on the extracted data and the information is compared with the decrypted validation information to validate that the data has been correctly decrypted.

Advantageous Effects of Invention

According to the storage system of the present invention, the encrypted data and the validation information thereof are stored in the storage media, and during restoration of the key information, the system attempts to decrypt the encrypted data and validation information in the storage media and validate the data using the validation information to determine whether the key information is the same encryption key as the encryption key used for encrypting the data stored in the storage media. Thereby, it becomes possible to validate the validity of the encryption key in the storage system.

BRIEF DESCRIPTION OF DRAWINGS

FIG. 1 is a configuration diagram of a storage system according to a preferred embodiment of the present invention.
[FIG. 2]
FIG. 2 illustrates a content of a logical volume management table.
FIG. 3 illustrates a content of a data encryption key management table.
FIG. 4 illustrates an outline of an LA/LRC information adding process according to the preferred embodiment of the present invention.
FIG. 5 illustrates an outline of a data encryption process according to the preferred embodiment of the present invention.
FIG. 6 illustrates an outline of an LA/LRC validation process during reading of data according to the preferred embodiment of the present invention.
FIG. 7 is a flowchart of a key verification process according to the preferred embodiment of the present invention.
FIG. 8 is a flowchart of a key verification process according to the preferred embodiment of the present invention.

DESCRIPTION OF EMBODIMENTS

Now, a storage system according to one preferred embodiment of the present invention will be described with reference to the drawings. However, the present invention is not restricted to the preferred embodiment illustrated below.

<Preferred Embodiment>

Figure 1:
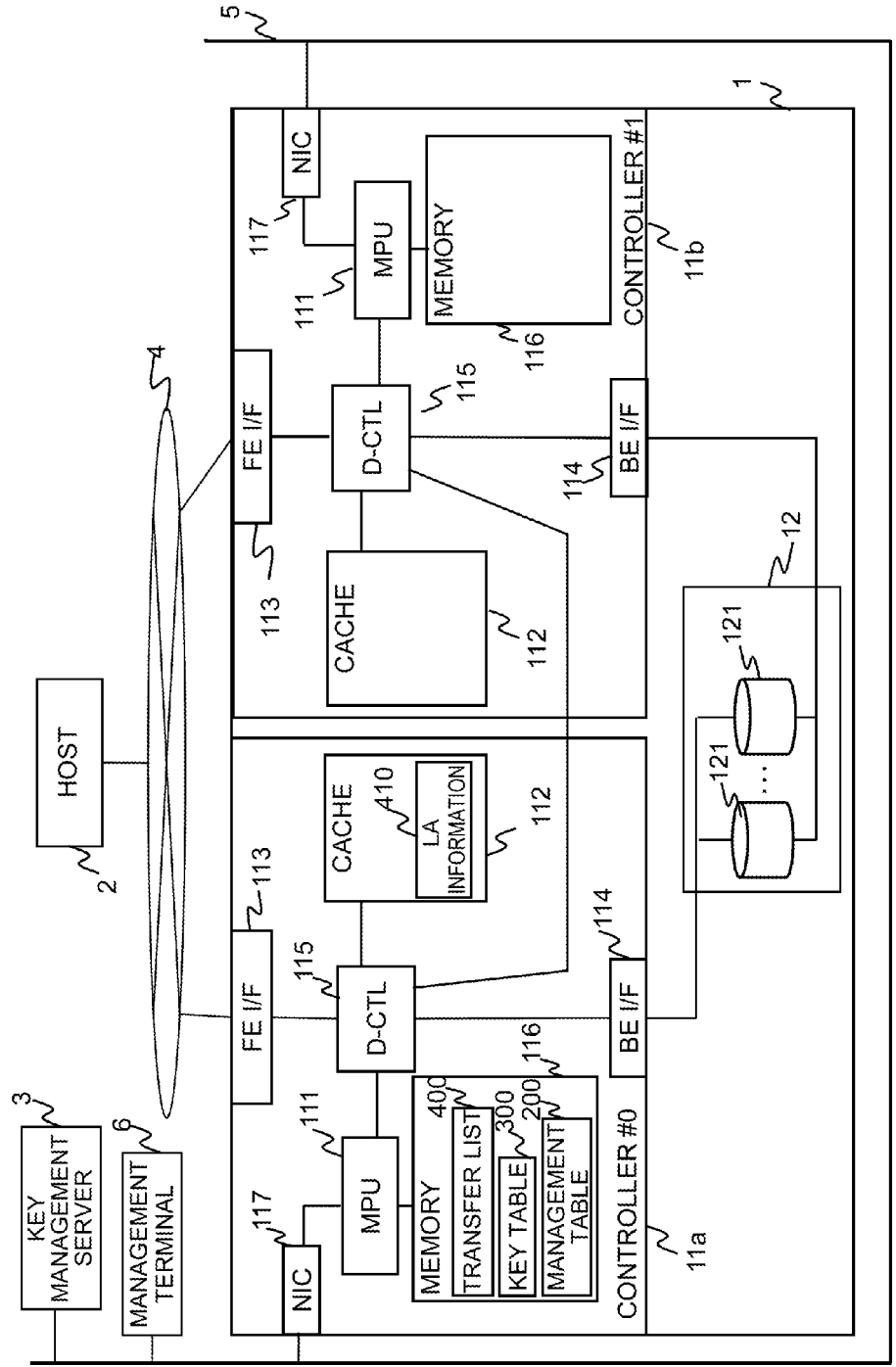
[FIG. 1]

FIG. 1 illustrates a configuration of a storage system 1 according to a preferred embodiment of the present invention, and a configuration of a computer system to which the storage system 1 is applied. The computer system is composed of a storage system 1, a host 2, a key management server 3, and a management terminal 6. The storage system 1 is connected to the host 2 via a SAN (Storage Area Network) 4, and also connected to the key management server 3 and the management terminal 6 via a LAN 5.

The storage system 1 is composed of storage controllers (hereinafter abbreviated as "controllers") 11a and 11b, and a disk enclosure 12 including multiple drives 121. The storage controllers 11a and 11b are each composed of an MPU 111 for controlling the corresponding storage system 1, a cache memory 112 (also referred to as a cache 112) for temporarily storing a replica of a portion of the data in the drives 121, a frontend interface (FE I/F) 113 for connecting to the SAN 4, a backend interface (BE I/F) 114 for connecting the drives 121, a D-CTL 115, a memory 116 for storing programs and control information, and a Network Interface Controller 117 for connecting to the LAN 5. The number of storage controllers (11a or 11b) included in the storage system 1 is not limited to two, and the number of storage controllers can be three or more, or only one. In the following description, when the processing executed in either the storage controller 11a or the storage controller 11b is described, only the flow of processing executed in the storage controller 11a will be described for simplified description.

The MPU 111 is a processor for controlling the storage system 1 by executing programs (not shown) stored in the memory 116. In addition to the programs executed by the MPU 111, the memory 116 stores management information and the like required for controlling the storage system 1.

An FE I/F 113 is an interface for performing transmission and reception of data with the host 2 via the SAN 4, and comprises, as an example, a DMA (Direct Memory Access) controller (not shown), and has a function to execute processing for transmitting write data from the host 2 to the cache 112 or to transmit the data within the cache 112 to the host 2 based on an instruction from the MPU 111. The BE I/F 114 is an interface for transmitting and receiving data to/from the drives 121, which has a DMA controller similar to the FE I/F 113, and has a function to transmit the data in the cache 112 to the drives 121 or to transmit the data in the drives 121 to the cache 112 based on the instructions from the MPU 111. Further, the BE I/F 114 has an encryption/decryption circuit (refer to FIGS. 5 and 6), which has a function to encrypt data to be transmitted when transmitting the data in the cache 112 to the drives 121, and a function to decrypt data when transmitting the data in the drives 121 to the cache 112.

The cache 112 is a storage area for temporarily storing a replica of a portion of the data in the drives 121 subjected to a read request from the host 2, or for temporarily storing the write data transmitted from the host 2, which can also include a means such as battery data backup for preventing data from being lost even when power failure or other failure occurs. Moreover, it is also used for storing a data encryption key used in the encryption function described later.

The D-CTL 115 is a chip composed of an application-specific integrated circuit (ASIC), and mutually connects the MPU 111, the cache 112, the FE I/F 113 and the BE I/F 114. The D-CTL 115 of the storage controller 11a and the D-CTL 115 of the storage controller 11b are mutually connected, so as to enable mutual transmission of data and control information among controllers 11a and 11b. Further, the D-CTL 115 has a function to add an LA/LRC mentioned later and a function to validate the LA/LRC of data to be transmitted with respect to the write data from the host 2. Further, the storage system 1 enables to recover data of the drives 121 during failure by generating a redundant data (parity) from the write data from the host 2 using RAID technique and storing the data and the parity in the drives 121, and the D-CTL 115 has a function to generate this parity.

Further, the storage controller 11a has an NIC 117, and enables communication with the management terminal 6 and the key management server 3.

The drives 121 are storage media for mainly storing write data from the host 2, wherein multiple drives are disposed in the storage system 1. In the embodiment of the present invention, magnetic disks are used as the drives 121, but storage media other than magnetic disks, such as SSDs (Solid State Drives), can be used. In the storage system 1, at least one drive 121 is determined as the "system drive", and this system drive saves information necessary for controlling the storage system 1 when stopping (turning the power off of) the storage system 1, such as a data encryption key and the like described later.

The host 2 is, for example, a server computer forming a core of a business system, which is equipped with hardware resources such as a processor, a memory, a host bus adapter for connecting to the SAN 4, a local input/output device and the like, and software resources such as a device driver, an operating system (OS) and an application program. In FIG. 1, only one host 2 is illustrated, but actually, it is possible to have multiple hosts 2 exist in the computer system and have multiple hosts 2 access the storage system 1.

The management terminal 6 is a terminal for performing management operation of the storage system 1, which is equipped with a processor, a memory, a network interface for connecting with the LAN 5, and a local input/output device such as a keyboard and a display. The management terminal also comprises a software (management software) for performing management operation of the storage system 1, and performs management operation of the storage system 1 by executing this management software. A management operation is specifically an operation for defining a volume provided to the host 2 and the like, and an operation for performing setup of encryption of the storage system 1, wherein these operations are performed by the administrator of the storage system 1 using the local input/output device of the management terminal 6.

The key management server 3 is a computer for managing an encryption key used by devices such as the storage system 1 having an encryption function, and includes hardware resources such as a processor, a memory, a network interface for connecting to the LAN 5, and local input and output devices such as keyboards and displays. Further, the server 3 has a function (key management software) for managing the encryption keys of the devices having the encryption function, and performs backup and restoration of the encryption keys of the respective devices by executing the key management software.

The SAN 4 is a network used for transmitting access requests (I/O requests) or the read data or the write data corresponding to the access request when the host 2 accesses (reads or writes) the data in the storage area (volume) of the storage system 1, and according to the present embodiment, a Fibre Channel is used as the physical media. However, it is possible to adopt a configuration using Ethernet or other transmission media. The LAN 5 is a transmission path used by the management terminal 6 and the key management server 3 when communicating with the storage system 1, and the Ethernet is used as the physical media, for example.

Next, we will describe the volumes created in the storage system 1 and the management information used in the storage system 1 for managing the volumes.

The storage system 1 according to the preferred embodiment of the present invention uses two or more of the multiple drives 121 to create RAID groups. Then, processes to store data based on RAID technique, which are, dividing the write data from the host 2 to given sizes (such as 16 KB), creating parities (redundant data) from the divided data, and storing the divided data and parities into respective drives within the RAID group are performed. According further to the storage system 1 of the present embodiment, the storage area of a single RAID group is provided as a single logical volume (also referred to as LDEV) to the host 2 (set to a state accessible from the host). Therefore, in the following description, the term "RAID group" and the term "logical volume" are used in the same meaning. Further, when the respective logical volumes are provided to the host 2, a logical unit number (LUN) is assigned to each logical volume, so that the host 2 can identify each volume by the LUN.

A logical volume management table 200 shown in FIG. 2 is a table for managing the correspondence relationship between a logical unit number (LUN) mapped to the respective logical volumes within the storage system 1 and an assembly of multiple drives constituting the logical volume (RAID group), which is stored in the memory 116. A LUN 201 is information showing the LUN assigned to each logical volume, and multiple values stored in the field of drive # 202 show the identification numbers of the respective drives 121 within the storage system 1. For example, the field of the LUN 201 in the head entry (row) of the logical volume management table 200 of FIG. 2 stores "0", and the field of drive #202 stores "0, 1, 2, 3", indicating that the logical volume having a LUN 201 of "0" is composed of drives 121 having identification numbers (hereinafter referred to as drive numbers) 0, 1, 2 and 3. A RAID level 203 stores a value representing the data redundancy method of the RAID group composed of the group of drives 121 of the drive # 202, which is so-called the RAID level value. Further, value "0" or "1" is stored in the field of an encryption attribute 204, wherein if the value in the field of the encryption attribute 204 is "1", it shows that encrypted data is stored in the drives 121 (the group of drives 121 specified by the field of drive #202) constituting the RAID group of that entry.

The present embodiment illustrates an example where the storage areas of a single RAID group correspond to a single logical volume, but other possible examples of the method for constituting volumes exist, such as where the storage areas of a single RAID group are divided to create multiple partial areas and each of the generated partial areas is provided as a single logical volume to the host 2, or where multiple RAID groups are provided as a single logical volume to the host 2. The present invention is effective regardless of which method is selected for constituting volumes.

Next, we will describe the data encryption performed by the storage system 1 according to the present embodiment. As described earlier, the storage system 1 encrypts the data stored in the drives 121 belonging to the entry where the value of the encryption attribute 204 is 1 in the logical volume management table 200. When the storage system 1 encrypts data and stores the same in the drives 121, encryption is performed using a data encryption key (hereinafter also abbreviated as "DEK"). During encryption, a different DEK is used for each drive 121. In contrast, all the data in a single drive 121 is encrypted by the same DEK. Moreover, the data encryption key is stored in a data encryption key management table (DEK management table) 300 within the memory 116.

Figure 3:
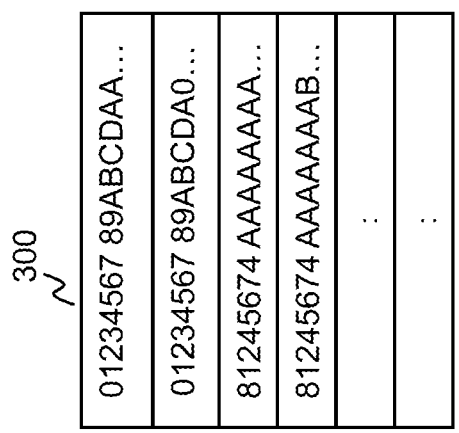
[FIG. 3]

FIG. 3 illustrates a configuration of the data encryption key management table (DEK management table) 300. The storage system 1 according to the present embodiment performs encryption—decryption using a common key cryptographic algorithm based on standards such as a DES (Data Encryption Standard) or an AES (Advanced Encryption Standard) and the like. Further, the sane number of entries as the number of drives 121 are provided in the DEK management table 300 for performing encryption—decryption using a different DEK for each drive 121. A DEK of the data stored in the drive 121 having a drive number 0 is stored in the head entry of the DEK management table 300, and sequentially thereafter, the DEK of data stored in the drive 121 having a drive number 1, and the DEK of the data stored in the drive 121 having a drive number 2 and so on are stored.

The encryption setting is performed when defining the logical volume. When the administrator of the storage system 1 defines a logical volume, the administrator uses the management terminal 6 to define a LUN of the logical volume, selects multiple drives 121 constituting the logical volume (belonging to the RAID group), and outputs an instruction designating the RAID level. The management terminal 6 receives this instruction and outputs an instruction to create a logical volume to the storage controller 11*a*, and the storage controller 11*a* stores the designated information to the LUN 201, the drive # 202 and the RAID level 203 in the logical volume management table 200. At this time, the management screen of the management terminal 6 enables to designate whether the defined logical volume should be encrypted or not, and when encryption of the logical volume is designated, the storage controller 11*a* stores "1" in the field of the encryption attribute 204 of the logical volume management table 200, creates the same number of DEKs as the number of drives 121 constituting the logical volume, and stores the DEK created in the given position within the DEK management table 300. The given position within the DEK management table 300 stored in the created DEK is determined by the drive number of the drives 121 constituting the logical volume. For example, according to the logical volume management table 200 of FIG. 2, the encryption attribute 204 of the logical volume of the second entry (the row where the LUN 201 is "1") is 1, and the drive # 202 constituting the logical volume defined in this entry is "4, 5, 6, 7". Therefore, the created DEKs are stored in the fifth through eighth entries of the DEK management table 300. Further, a replica of the content of the DEK management table 300 is stored in the buffer provided in the BE I/F 114, and at the point of time when a new encryption key is registered in the DEK management table 300 or when the content thereof is updated, the content of the DEK management table 300 is copied to the buffer in he BE I/F 114.

When the information of the newly defined logical volume and DEK are stored in the logical volume management table 200 and the DEK management table 300, the storage controller 11*a* further initializes the drives 121 constituting the newly defined logical volume. Specifically, initial data (such as all zero, or other values) is written to the drives 121 constituting the newly defined logical volume. At this time, initial data is encrypted in the BE I/F 114, and the encrypted data is written into the drives 121. The RAID parity is also similarly encrypted in the BE I/F 114, and the encrypted parity is stored in the drives 121. The processing performed when encrypting data and writing the encrypted data in the drives 121 will be described in detail later.

Next, we will describe the flow of data within the storage system 1 when the host 2 performs writing or reading of data. Upon storing data in the drives 121, the storage system 1 according to the present invention adds validation information capable of detecting error later with respect to the data, and stores the data and this validation information in the drives 121. This validation information is added for each of a single disk block (also referred to as a single sector, the size of which is 512 bytes), which is the minimum access unit of the drives 121. Further, an LBA of the logical volume and an exclusive OR of all bytes in the single disk block is used as the validation information. Hereafter, the LBA of the logical volume used in the validation information is called an LA (abbreviation of Logical Address), and the exclusive OR of all bytes of the single disk block is called an LRC (Longitudinal Redundancy Code). When reading data, whether the data stored in a wrong storage position is read or not can be confirmed by checking the LA, and whether an error is included in the data content or not can be confirmed by checking the LRC. The present embodiment uses the LBA of the logical volume and the exclusive OR of all bytes of the single disk block as the validation information, but other arbitrary information can be used as the validation information, as long as the information can be used for detecting the error in the data content or the information can be used for validating the validity of the data write position. For example, it is possible to use the LBA of the drives 121 storing the data instead of the LBA of the logical volumes. It is also possible to use other information derived from the LBA of the logical volumes or the LBA of the drives 121 instead of using the LBA of the logical volumes or the LBA of the drives 121 itself as the validation information. Further, instead of the exclusive OR of the data, it is possible to use an arbitrary information which is created by executing a given computation to data, such as CRC (Cyclic Redundancy Check), and information capable of detecting data error (error detection code).

Figure 4:
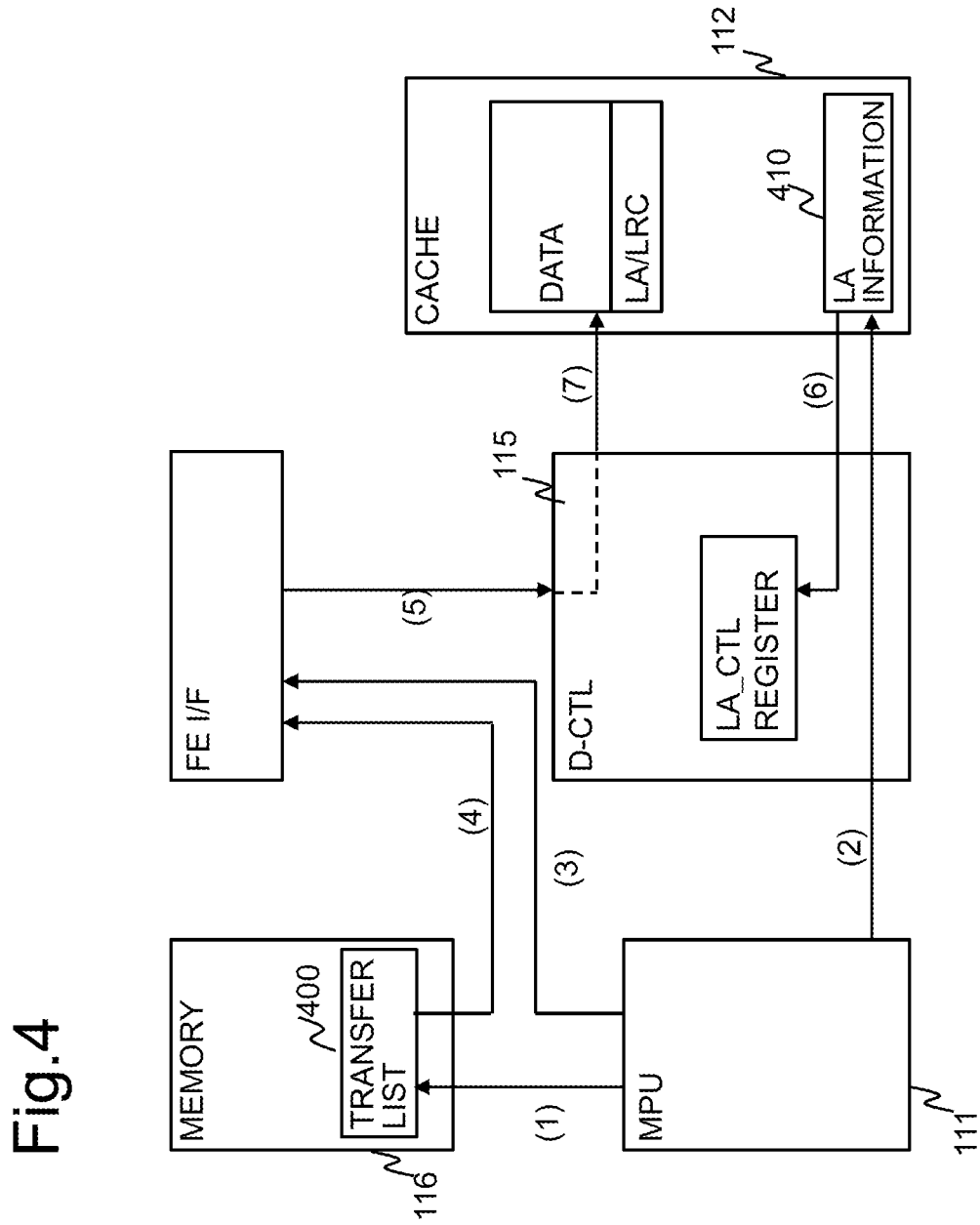
[FIG. 4]

Hereafter, the method for using the LA/LRC and the flow of the data encryption—decryption processing according to the storage system 1 of the present embodiment will be described with reference to FIGS. 4 through 6. FIG. 4 illustrates the flow of data when the host 2 issues a write request to the logical volume (LU) and the data accompanying the write request is stored in the cache 112 of the storage system 1. The following describes an example of a case where the write request of data corresponding to a single disk block arrives from the host 2 for simplified description, but a similar processing is performed when write processing of data corresponding to multiple disk blocks is performed.

When a write request (write command) arrives from the host 2 to the FE I/F 113 of the storage system 1, the MPU 111 analyzes the content of the write command. The write command at least includes a LUN of the logical volume and the LBA of the logical volume which are the positional information of the write destination of the write target, and the write data length, and the MPU 111 extracts these information from the write command. The MPU 111 allocates the area having the necessary size for storing the write data from the unused areas in the cache memory 112 based on the write data length. If the write data length is the size corresponding to a single disk block, an area corresponding to 512 bytes and the size of the LA/LRC is allocated in the cache memory 112. Then, a transfer list 400 which is the instruction information to the DMA controller of the FE I/F 113 is created and stored in the memory 116 (FIG. 4 (1)). The transfer list mainly includes address information in the cache memory 112 which becomes the write destination of write data from the host 2.

Next, the MPU 111 stores an LA information 410 in the cache memory 112 (FIG. 4 (2)). The LA information 410 is the LBA of the logical volume included in the write request, and this information is used to add an LA later.

Thereafter, the MPU 111 transmits an instruction to start data transfer to the FE I/F 113 (FIG. 4 (3)). When the FE I/F 113 receives this instruction, it reads the transfer list 400 in the memory 116 (FIG. 4 (4)), and based on the transfer list, starts data transfer to the cache memory 112 (FIG. 4 (5)).

The write data from the host 2 is transferred via the D-CTL 115 temporarily before being stored in the cache 112. When the write data arrives from the FE I/F 113, the D-CTL 115 reads the LA information 410 in the cache 112 (FIG. 4 (6)), and adds the LA information 410 as LA to the rear end of the write data. Further, it calculates the exclusive OR (LRC) of all bytes of the write data, and adds the same to the end of the LA. After adding the LA and the LRC to the data, the D-CTL 115 stores the data having the LA and the LRC added thereto to the cache 112 (FIG. 4 (7)).

Next, with reference to FIG. 5, the processing for encrypting the write data stored in the cache 112 via the processing illustrated in FIG. 4 and storing the same in the drive 121 (hereinafter, this processing will be referred to as "destaging") will be described.

Although not shown, the MPU 111 manages the positional information in the logical volume of each data stored (cached) in the cache 112 (information showing which LBA of which logical volume the data should be stored) in the memory 116. At the first of the destaging process, the MPU 111 computes, based on this positional information in the logical volume, the drive 121 to which the data in the cache 112 should be stored and the address in that drive 121 (the LBA of the drive 121; hereafter, in order to prevent confusion of this LBA and the LBA of the logical volume, the address information of the storage area within the drive 121 is referred to as drive LBA) are computed. This process is a well-known function of a normal storage system constituting a logical volume using multiple drives and providing the same to a higher-level device, so the detailed descriptions thereof are omitted.

Figure 5:
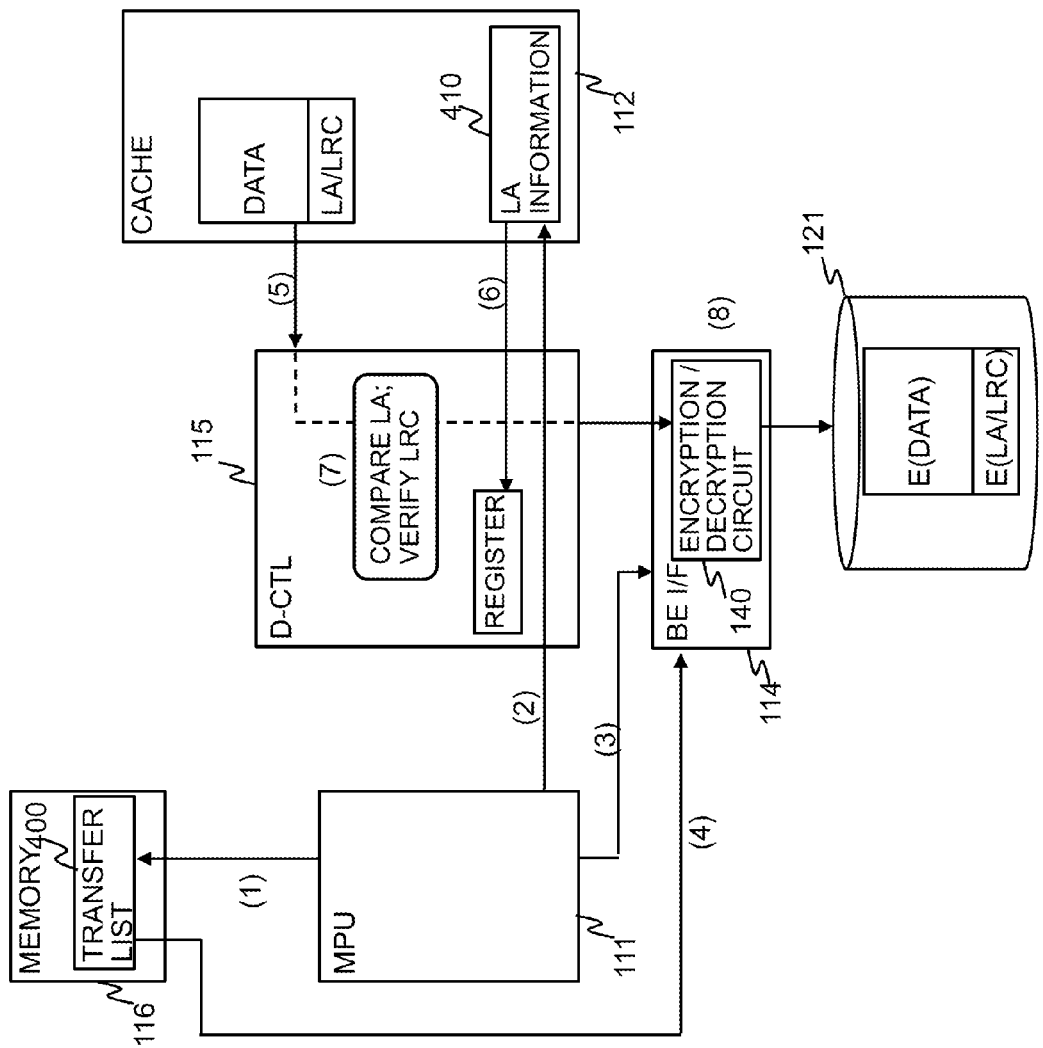
[FIG. 5]

Thereafter, the MPU 111 creates a transfer list which is an instruction information to the DMA controller of the BE I/F 114, and stores the same in the memory 116 (FIG. 5 (1)). The transfer list includes a transfer source data address, that is, the address information in the cache memory 112 storing the write data. Further, the MPU 111 stores the positional information (LBA) in the logical volume of the write target data in the cache memory 112 managed by the MPU 111 to the cache memory 112 as the LA information 410 (FIG. 5 (2)).

Next, the MPU 111 transmits an instruction for starting transfer of data to the BE I/F 114 (FIG. 5 (3)). At that time, the MPU 111 includes the following information in the instruction information, the drive number of the drive 121 in which the write target data is stored, the drive LBA of the drive 121 specified by the drive number, and that encryption should be performed when storing data, and transmits the instruction. Upon receiving the instruction, the BE I/F 114 reads the transfer list in the memory (FIG. 5 (4)), and based on the transfer list, starts data transfer from the cache memory 112 (FIG. 5 (5)). At this time, the LA and the LRC added by the process illustrated in FIG. 4 is also transferred in addition to the data.

The data read from the cache 112 temporarily passes the D-CTL 115 before reaching the BE I/F 114. When data arrives to the D-CTL 115, the LA information 410 in the cache 112 is read (FIG. 5 (6)), and the LA information 410 is compared with the LA added to the data. Further, the exclusive OR (ORC) of all bytes of the data are computed, which is compared with the LRC information transferred from the cache 112 (FIG. 5 (7)). As a result of the comparison, if the LA information 410 and the LA added to the data are inconsistent, or if the result of the exclusive OR computation and the LRC information transferred from the cache 112 are inconsistent, the D-CTL 115 notifies the MPU 111 that an error has occurred. When occurrence of error is notified from the MPU 111, the D-CTL 115 discontinues the destaging process. If the comparison result of LA and LRC is consistent, the data is transmitted to the BE I/F 114, and a notice notifying that the process has been performed correctly is sent to the MPU 111.

The BE I/F 114 encrypts the received data, and thereafter, writes the encrypted data to the drive 121 (FIG. 5 (8)). Since the drive number and the drive LBA of the drive 121 storing the write target data is received in process (3), the BE I/F 114 extracts a DEK corresponding to the drive number from the DEK management table within the encryption/decryption circuit 140, uses the DEK to encrypt the data, and writes the encrypted data to the disk block within the drive 121. At this time, the BE I/F 114 encrypts the LA and the LRC added to the rear end of the data using the same DEK as the DEK used for encrypting data, and stores the data to the same disk block as the disk block in which the data is stored. According to the drive 121 of the storage system 1 of the present embodiment, the size of each disk block is not the general disk block size (512 bytes) of a drive 121, but a size capable of storing the LA/LRC in addition to the data (if the total size of LA and LRC is 8 bytes, the size of a single disk block of the drive 121 should be 520 bytes).

Figure 6:
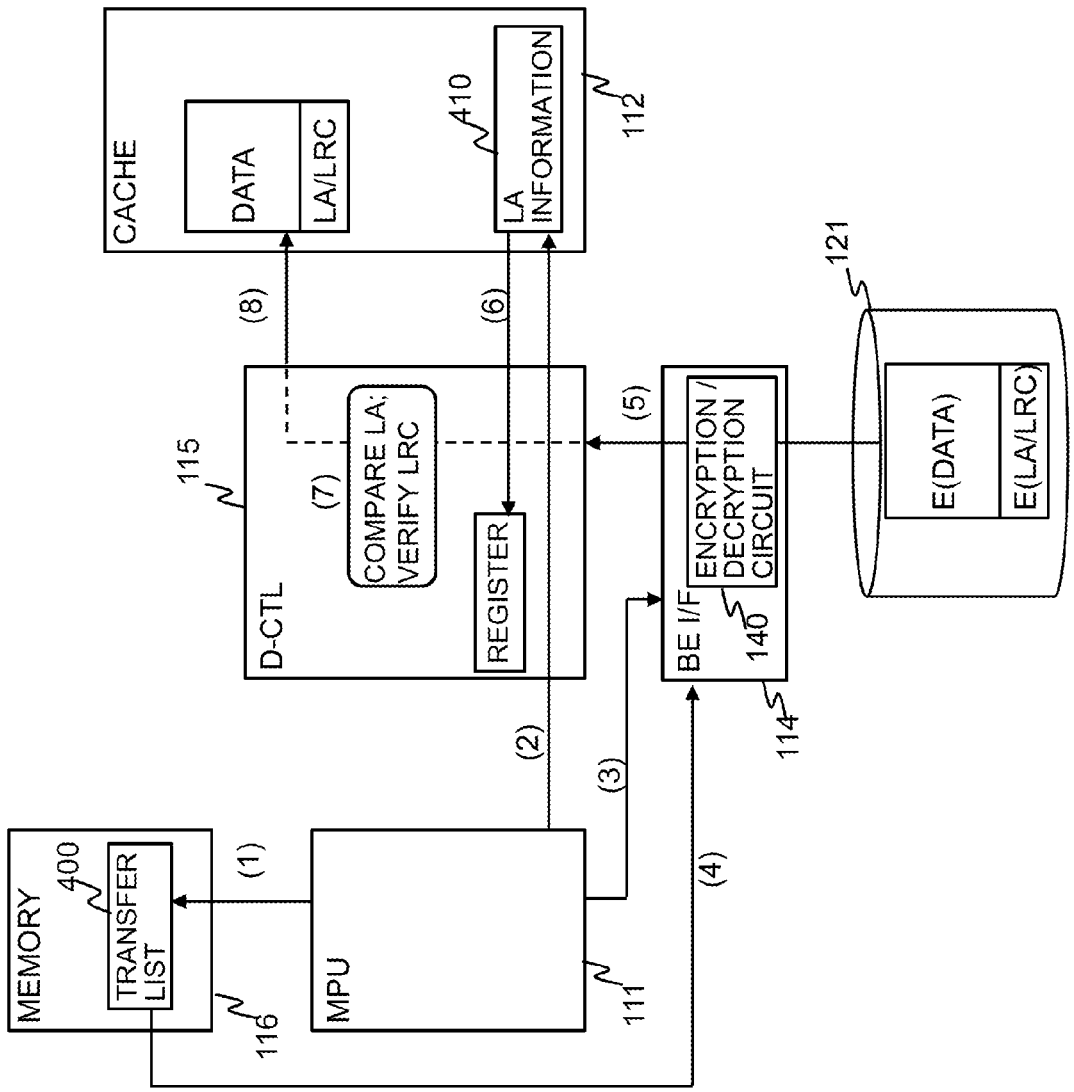
[FIG. 6]

Next, with reference to FIG. 6, we will describe the flow of the process performed when a read request of data in the logical volume arrives from the host 2.

When a read request (read command) arrives from the host 2 to the FE I/F 113 of the storage system 1, the MPU 111 analyzes the content of the read command. The read command at least includes the positional information of the read target data, which are the LUN of the logical volume and the LBA of that logical volume, and the read data length, the MPU 111 extracts this information from the read command. Based on the read data length, wherein the MPU 111 allocates the area having a size necessary for storing data from the unused area in the cache memory 112. If the write data length is the size corresponding to a single disk block (512 bytes), an area of 512 bytes plus the size of LA/LRC is allocated in the cache memory 112.

Next, the MPU 111 converts the positional information of the read target data received by the read command (LUN and LBA of the logical volume) to the drive number and the drive LBA of the drive 121 storing the read target data. This process is a well-known function provided to a storage system forming a logical volume from multiple drives and providing the same to a higher-level device, so that detailed descriptions thereof are omitted.

Thereafter, the MPU 111 creates a transfer list which is an instruction information to the DMA controller of the BE I/F 114, and stores the same in the memory 116 (FIG. 6 (1)). The transfer list mainly includes address information in the cache memory 112 of the transfer destination of the read data. Further, the MPU 111 stores the LBA included in the read command as the LA information 410 to the cache memory 112 (FIG. 6 (2)).

Next, the MPU 111 transmits an instruction to start data transfer to the BE I/F 114 (FIG. 6 (3)). At that time, the MPU 111 includes to the instruction information the drive number and the drive LBA of the drive 121 storing the read target data and that decryption should be performed when reading data, and transmits the instruction. Based on this instruction, the BE I/F 114 reads the read target data and the LA and the LRC added to the data from the drive 121, and performs decryption. Prior to decryption, the BE I/F 114 extracts the DEK specified by the drive number from the DEK management table in the encryption/decryption circuit 140, and decryption of data (with LA and LRC) is performed using the DEK. After decryption, the BE I/F 114 reads the transfer list 400 in the memory (FIG. 6 (4)), and transfers data to the cache 112 (FIG. 6 (5)). At this time, the LA and the LRC are also transferred in addition to the data.

The data read from the drives 121 temporarily passes through the D-CTL 115 before reaching the cache 112. When data arrives, the D-CTL 115 reads the LA information 410 in the cache 112 (FIG. 6 (6)), and compares the LA information 410 and the LA added to the data. Further, it computes the exclusive OR (LRC) of all bytes of the data, and compares the same with the LRC information read from the drives 121 (FIG. 6 (7)). As a result of the comparison, if it is determined that the LA information 410 and the LA added to the data are inconsistent, or that the result of the exclusive OR computation and the LRC information transferred from the cache 112 are inconsistent, the D-CTL 115 notifies the MPU 111 that an error has occurred, and the MPU 111 discontinues the process. If the comparison result of LA and LRC correspond, a notice is sent to the MPU 111 notifying that the result of comparison is normal, and the data read from the drives 121 is transmitted to the cache 112. Thereafter, the data transmitted to the cache 112 is transferred to the host 2, and the read processing is completed.

Next, we will describe a key verification process according to the present invention. When the storage system 1 is stopped (shut down or turned off), the controller 11 stores (saves) the replica of the DEKs stored in the DEK management table 300 in the memory 116 to a given area within the system drive. The DEKs saved in the system drive is read when the storage system 1 is started, loaded to the DEK management table 300 of the memory 116, and further, a replica of the DEK management table 300 in the memory 116 is stored in the buffer within the BE I/F 114. During this process, when the DEKs are not correctly read due to causes such as the failure of a control program of the storage system 1, and when the content of the DEKs has been changed during the reading process, if data is read from the drive 121 according to the read request from the host 2, decryption using an encryption key that differs from the encryption key used when storing data to the drives 121 will be performed, so that incorrect data is transmitted to the host 2. Similarly, when the DEKs in the memory 116 or the system drive are rewritten unreasonably to a different value, erroneous data may be written to the drives 121 or erroneous data may be transmitted to the host 2.

Further, the storage system 1 has a function to back-up the data encryption key in the key management server 3, and when the system drive fails, it is possible to have the data encryption key restored from the key management server 3, but there is a possibility that erroneous key information is restored from the key management server 3, and in that case, erroneous data will be transmitted to the host 2. The key verification process is a process to validate the validity of the data encryption key to prevent such case from occurring, and according to the preferred embodiment of the present invention, the process is executed when starting the storage system 1 (turning the power on), and restoring the data encryption key from an external key management server 3.

Figure 7:
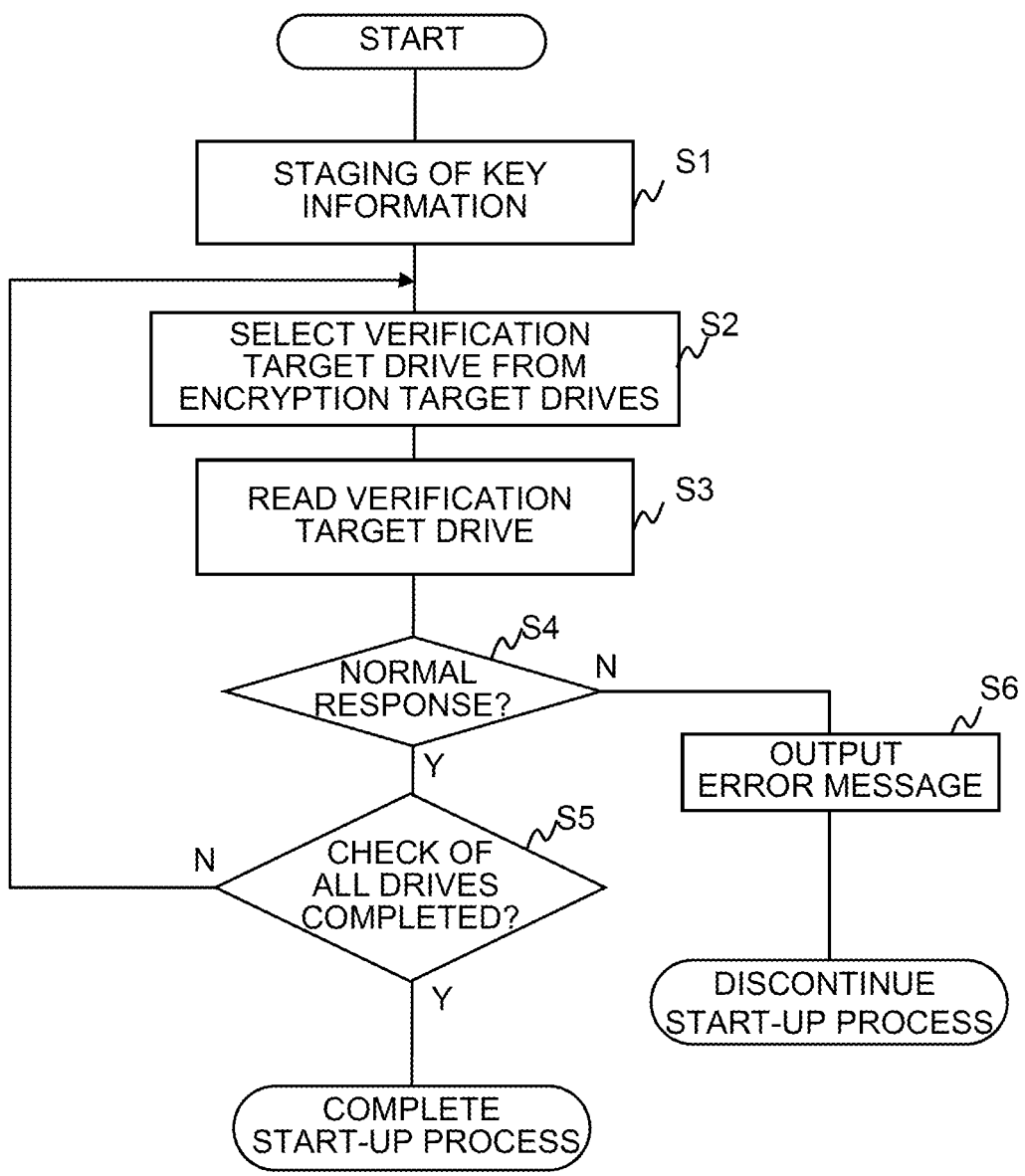
[FIG. 7]

FIG. 7 is a flowchart showing the flow of the key verification process executed when starting the storage system 1. This process is executed after starting the storage system 1 (power on), at least when the storage controller 11 is in a state accessible to the drives 121, and before the access from the host 2 to the storage system 1 is enabled. In other words, until the key verification process is completed, the storage system 1 will not allow access from the host 2 to the logical volume.

At first, the DEKs saved in the system drive are staged in the cache memory 112, and the staged DEKs are stored in the DEK management table 300 in the memory 116 and also stored in the buffer in the BE I/F 114 (S1). Thereafter, the processes of S2 through S4 are executed for all the drives 121 storing the encrypted data. At first, the procedure refers to the logical volume management table 200 to refer to the field of the drive # 202 for all the entries where the encryption attribute 204 is "1", and all the drive numbers stored in the field of the drive # 202 are extracted. The processes of S2 through S4 are executed for all the drives 121 corresponding to the extracted drive numbers.

In S2, a single drive number is selected out of the previously extracted drive numbers, and in S3, the MPU 111 issues a read command to the drive 121 having the selected drive number, and attempts to read the data (S3). According to the key verification process of the present embodiment, the data in a prescribed position (such as an address whose drive LBA number is 100, for example) is read from all the drives 121, but the data in any area can be read as long as the area stores encrypted data.

The read process of S3 performs a similar process as the process illustrated in FIG. 6 described earlier. However, the process described with reference to FIG. 6 converts the address (LBA) of the logical volume designated by the read command from the host 2 to the address (drive LBA) of the drives 121, and reads the data of the converted address, but according to S3, the storage controller 11a (MPU 111) executes the read process independently from the instruction from the host 2, so that there is no read command provided from the host 2. Therefore, the read process of S3 mainly differs from the process illustrated in FIG. 6 in that the LA information used for comparison with the LA performed in midway of the read processing is created by the MPU 111. When storing the LA information 410 in the cache 112, the MPU 111 computes the logical volume address (LBA) from the drive LBA at a given position in the drive 121 being the read target. This computing function is a function provided in a well-known storage subsystem, so that detailed descriptions thereof are omitted. The computed LBA of the logical volume is stored as the LA information 410 in the cache memory 112. Hereafter, the LA information computed by the MPU 111 is called an expectation value of LA.

When the MPU 111 stores the LA information 410 in the cache 112 and issues an instruction to start data transfer to the BE I/F 114, data transfer from the drives 121 to the cache 112 is started. During the data transfer process, when the data and LA/LRC decrypted in the BE I/F 114 arrives at the D-CTL 115, the D-CTL 115 reads the LA information 410 (that is, the expectation value of LA) in the cache 112, and compares the expectation value of the LA with the decrypted LA to thereby verify the LA. Further, the exclusive OR (LRC) of all bytes of the data is computed and compared with the LRC information read from the drives 121 to thereby verify the LRC.

If the decryption process of data and LA/LRC in the BE I/F 114 is performed using a DEK that differs from the DEK used when encrypting the data and the LA/LRC in the decryption process, the decrypted LA will be a different value as the proper LA (plaintext LA before being stored in the drives 121; the value of which is equal to the expectation value of LA). Further, the value of the decrypted LRC and the value obtained by subjecting all bytes of the decrypted data to exclusive OR operation will be different values (strictly, the possibility that these two values coincidentally become the same is not zero, but the probability is extremely low). Therefore, when verification of LA and/or LRC is performed, it becomes possible to verify whether the key information staged in S1 is correct (whether it is the same DEK as the DEK used when storing data in the drives 121) or not.

When the expectation value of LA and the LA added to the data are inconsistent, or if the result of the exclusive OR operation and the decrypted LRC information read from the cache 112 are inconsistent, the D-CTL 115 notifies the MPU 111 that an error has occurred. If the comparison result of LA and the comparison result of LRC are both consistent, a notice notifying that the verification result is normal is sent to the MPU 111.

In S4, it is determined whether the result notified from the D-CTL 115 to the MPU 111 in S3 is normal or not. If the notified result is normal (S4: Y), the procedure advances to S5, but if a notice notifying that an error has occurred is sent to the MPU 111 (S4: N), the MPU 111 sends an instruction to the management terminal 6 to output an error message that the DEK is invalid. The management terminal 6 having received this instruction outputs an error message on the display of the management terminal 6 (S6), and thereafter, the MPU 111 discontinues the starting process of the storage system 1. In other words, if it is determined that the data encryption key is not correct, the starting process of the storage system 1 is discontinued.

On the other hand, if the notified result is normal (S4: Y), the procedure advances to S5. In S5, it is confirmed whether verification process (process of S2 through S4) has been completed for all the drives 121 storing the encrypted data or not, and if there still remains a drive 121 not subjected to the verification process, the procedure returns to S2. If verification process has been completed for all the drives 121 storing the encrypted data, the verification process is ended. Hereafter, a normal process for starting the storage system 1 is performed subsequently, and when the starting process is completed, the storage system 1 transits to a state capable of receiving access from the host 2.

Next, the flow of the key verification process performed during key restoration will be explained with reference to FIG. 8. The key restoration process is performed when the data encryption key is lost from the storage system 1, such as when the system drive breaks down. Further, if the starting process of the storage system 1 is discontinued due to the key verification process described with reference to FIG. 7, it is not possible to access the logical volume from the host 2, but it is possible to perform a restoration operation of the DEKs (update the content of the DEK management table 300 to a correct key information), so that the key restoration process is performed when the starting process of the storage system 1 is discontinued.

In S11, the key management server 3 performs restoration of the DEKs to the storage system 1. This process is realized by the administrator operating the management terminal 6 and issuing a request of key restoration to the key management server 3. The key management server 3 having received the request to restore the key transmits the DEKs (DEKs of all drives 121) of the storage system 1 managed by the key management server 3 to the storage system 1 via the LAN 5. Further, the storage system 1 performs backup process of the DEKs to the key management server 3 for multiple number of times during normal operation. In that case, multiple backups of DEKs are retained in the key management server 3, and the respective DEKs are managed in the key management server 3 together with the date and time information of the time when backup has been performed. When the key management server manages multiple backups of DEKs of the storage system 1, in S11 during an initial restoration of DEKs, the DEKs of the latest generation (DEKs whose backup date and time are closest to the current time) is restored. Further, as mentioned later, it is possible to perform the process of S11 for multiple times, but after the second time, such as during the N-th key restoration process, the DEKs of the N-th generation, that is, the N-th latest DEKs, are restored.

In S12, the controller 11 stores the DEKs received from the key management server 3 to a temporary buffer allocated in the memory 116.

In S13, out of the RAID groups (logical volumes) storing the encrypted data, one RAID group not performing the verification process in the restored DEK (stored in the temporary buffer) is selected. Actually, the controller refers to the logical volume management table 200, and out of the RAID groups in which the encryption attribute 204 is "1", an entry where the verification process is not performed by the key restored in the process of S12 is selected.

Next, regarding the RAID group (logical volume) composed of the drive 121 storing the encrypted data, a state is selected to not process the accesses from the host 2 (the processing of the command is temporarily set to standby even when an I/O command is received from the host 2) (S14).

In S15, a single drive 121 is selected from the drives 121 constituting the RAID group selected in S13. Actually, a single drive number is selected from the multiple drive numbers stored in the drive # 202 of the entry selected in S13.

In S16, the controller attempts to read data in the drive 121 selected in S15, and performs verification of the LA and the LRC. This process is similar to the process of S3 of FIG. 7, but S16 differs from S3 of FIG. 7 in that in the data decryption process performed during reading of data, the DEK stored in the temporary buffer is used. When the MPU 111 outputs an instruction to read data to the BE I/F 114, the DEK stored in the temporary buffer is transmitted to the BE I/F 114, and the BE I/F 114 uses the DEK to perform decryption. The other processes are similar to S3 of FIG. 7.

When the verification result is normal in the process of S16 (S17: Y), the procedure advances to S18. In S18, it is determined whether verification has been completed for all the drives 121 within the RAID group selected in S13. If there still remains a drive 121 not subjected to verification out of the drives 121 within the RAID group, the procedure returns to S15.

If the result of verification in the process of S16 is not normal (S17: N), the validation process to the RAID group (the RAID group selected in S13) is discontinued, and the procedure advances to S22. The processes of S22 and thereafter will be described later.

In S18, it is determined whether validation has been completed for all drives 121 within the RAID group selected in S13, and if validation has been completed for all drives 121 (S18: Y), the procedure advances to S19. In S19, the RAID group (logical volume) validated via the processes of S13 through S18 is changed to a state capable of receiving an I/O request from the host 2. If there is still a drive 121 that is not subjected to validation (S17: N), the procedure returns to S15.

In S20, it is determined whether verification has been completed for all RAID groups storing encrypted data, and if there still remains a RAID group not subjected to validation (S21: N), the procedure returns to S13. The procedure advances to S21 when validation has been completed for all RAID groups.

In S21, the encryption key stored in the temporary buffer is stored in the DEK management table 300 and the buffer in the BE I/F 114, and the key verification process is ended.

If the validation result is not normal in the process of S16 (S17: N), the procedure advances to S22. In S22, the same process as S19 is performed. That is, the RAID group (logical volume) having the I/O request suppressed in S14 is changed so as to enable reception of I/O request from the host 2.

In S23, whether the validation processing (S13 through S20) have been performed for all generations of the encryption key being backed up in the key management server 3 is determined, and if there is an encryption key of the generation not being subjected to validation processing (S23: N), the procedure returns to S11, restores the encryption key of the subsequent generation (key that is one generation prior to the generation of the key subjected to validation immediately before the determination of S23) from the key management server 3, and performs the validation process of S12 and thereafter.

On the other hand, when it is determined in S23 that the validation processing has been performed for all generations of the encryption key being backed up in the key management server 3 (S23: Y), the procedure advances to S24. The case where the process reaches S24 is that validation processing has been performed for the encryption keys of all generations backed up in the key management server 3 but the validation result of S16 is not normal by using any of the encryption keys of all generations. Therefore, the MPU 111 sends an instruction to the management terminal 6 to output an error message that the DEK is invalid, and ends the key restoration processing. The management terminal 6 receives this instruction, and outputs an error message to the display of the management terminal 6.

The above describes the encryption key verification method of the storage system according to the preferred embodiment of the present invention. According to the encryption key verification method of the present invention, the data in the storage media is decrypted using the key information during restoration of the key information, and validation is performed using the validation information. Thus, it becomes possible to determine whether the restored key information uses the same encryption key as the encryption key used during encryption of data stored in the storage media, and even when a read/write request of the data in the storage media arrives from the host computer thereafter, it becomes possible to encrypt—decrypt the data using a normal encryption key, and to ensure the completeness of the data.

The preferred embodiment of the present invention has been described above, but the embodiment is a mere example for describing the present invention, and it should be noted that the present invention is not intended to be restricted to the above-illustrated embodiment. The present invention can be implemented in other various embodiments. For example, as described earlier, the number of controllers 11a and 11b in the storage system 1 is not restricted to the number illustrated in FIG. 1. Further, the components within the controllers 11a and 11b, that are, the MPU 111, the FE I/F 113, the BE I/F 114 and so on are not restricted to the numbers illustrated in FIG. 1, and the present invention is effective even in a configuration where multiple MPUs exist. Furthermore, the present invention can adopt a configuration where the cache 112 and the memory 116 are integrated.

Further, according to the storage system 1 of the above-described embodiment, the encryption/decryption circuit which is the means for performing encryption—decryption is disposed in the BE I/F of the storage controller, but the present invention is not restricted to such configuration, and the present invention is effective in a configuration where the encryption—decryption is performed by the MPU 111 or the D-CTL 115.

According to the above-described embodiment, multiple drives are defined as the RAID group and provided as logical volume to the host, but in the present invention, the RAID technique is not an indispensible element, and it is possible to compose the volume provided to the host from a single drive. In the above-described storage system 1, the LA/LRC is added to the tail of the data and written into the drive, but the location in which the LA/LRC is added is not restricted to the tail of the data, and it is possible to add the information to the head the data.

Further according to the storage system 1 of the present invention, the data encryption key (DEK) is created by the storage system 1 when the logical volume is defined, but it is possible to create the encryption key by an external device such as a key management server, and to use the DEK created by the key management server.

In the above-described key verification process, reading of data in the drives 121 is performed once, and if error has occurred as a result of validating the LA or the LRC, the starting of the storage system 1 is discontinued, but the cause of occurrence of error through validation of the LA or LRC can be other than the invalidity of the DEK, that is, the cause of error can be a temporary failure of hardware (the BE I/F 114, the transmission path connecting the drives 121 and the storage controller 11a, for example). The method for coping with the problem differs between when the cause of error is the invalidity of the DEK and when the cause is other than the invalidity of the DEK, it is preferable to identify the cause of occurrence of error.

Figure 8:
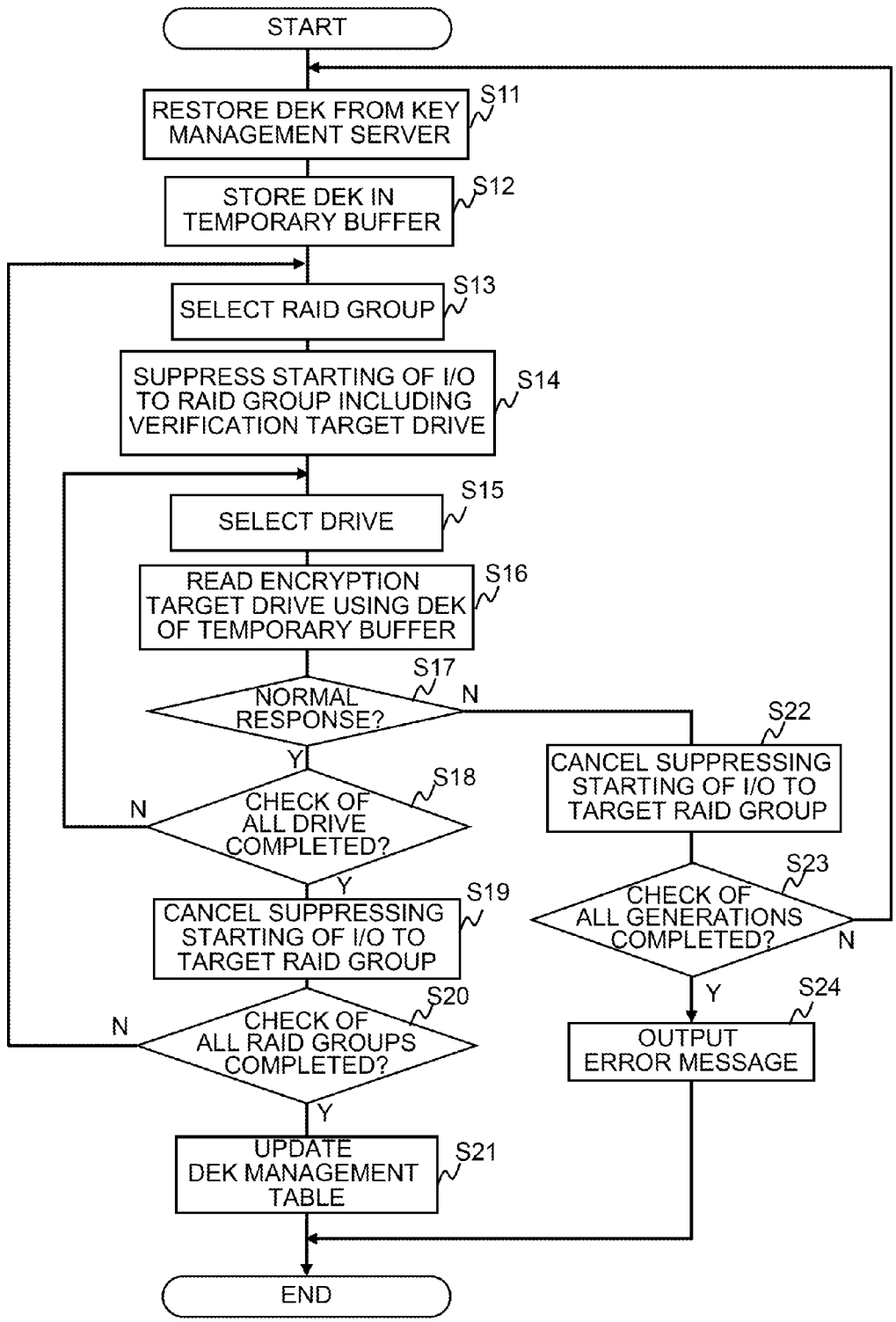
[FIG. 8]

One example is a method for executing a step for confirming whether error has occurred or not by issuing a diagnostic command to the respective drives 121 prior to starting the key verification process (such as before S1 of FIG. 7 or before S11 of FIG. 8). When an error is detected as a result of issuing a diagnostic command to the drives 121, it can be determined that a failure has occurred to the drives 121, and that the DEK is not invalid. Therefore, in this case, a method that differs from when invalidity of the DEK has been detected should be performed, such as blocking the drive 121 (and the RAID group including the drive 121) where error has been detected instead of discontinuing the starting of the storage system 1.

Further, during the key verification process (S3 and S4 of FIG. 7, for example), it is possible to perform reading of data of the same sector again (and to perform validation of the LA/LRC) when error occurs by validating the LA/LRC when reading of data in a certain sector in the drive 121 is performed once, instead of when reading of data in the drive 121 is performed once. This is because there is a high possibility that the DEK is not invalid if error does not occur by the second verification. It is possible to adopt a method to not output an error message notifying that the DEK is invalid to the management terminal (but some type of warning message notifying a condition other than the invalidity of the DEK can be output) when error does not occur by the second verification, and continue the starting process of the storage system 1 to enable I/O requests from the host to the logical volume to be received. Further, when an error occurs as a result of validation of the data read and the LA/LRC of the sector in the drive 121, it is possible to read a different sector instead of reading the same sector to perform validation of the LA/LRC. If error occurs during validation of the LA/LRC caused by the damage of data contents within the sector of the drive 121, it is highly possible that only a portion of the sector data in the drive 121 is damaged. Therefore, if error does not occur as a result of validation of the LA/LRC when different data is read, it can be identified that the cause of error is not the invalidity of the DEK but the damage of content of data in a portion of the sectors, so that the cause of error can be identified correctly compared to the method where the same data is read again.

It is also possible to simultaneously adopt the method for issuing a diagnostic command to the respective drives 121 when starting the key verification process and the method of performing validation of the LA/LRC for multiple times.

It is possible to add a process of determining that the DEK is not invalid if error occurs by verifying the LA but error does not occur by verifying the LRC or if error does not occur by verifying the LA but error occurs by verifying the LA.

According further to the key verification process of the present embodiment, validation is performed using two validation information, which are LA and LRC, but it is possible to perform validation of only the LA by adding only LA to the data, or to perform validation of the LRC by adding only LRC to the data.

Furthermore, the components described as programs in the description can be realized via hardware using hard wired logic or the like. It is also possible to provide the respective programs in the embodiment by storing the same in storage media such as CD-ROMs and DVDs.

REFERENCE SIGNS LIST

1: Storage system
2: Host
3: Key management server
4: SAN
5: LAN
6: Management terminal
11a, 11b: Storage controller
12: Disk enclosure
111: MPU
112: Cache Memory
113: FE I/F
114: BE I/F
115: D-CTL
116: Memory
117: NIC
121: Drive
140: Encryption/decryption circuit
200: Logical volume management table
300: Data encryption key management table (DEK management table)

The invention claimed is:

1. A storage system comprising a controller and one or more storage media; wherein
   a host for reading and writing data in the storage media and a management terminal for performing a management operation of the storage system are connected to the storage system;
   the controller has a storage area for storing an encryption key, and when a write request from the host is received, the controller creates a validation information corresponding to data accompanying the write request, adds the validation information to the data, encrypts the data having the validation information added thereto using the encryption key stored in the storage area and stores the same in the storage media;
   when a second encryption key is stored in the storage area, prior to receiving an access request to the storage media from the host, the controller:

reads the encrypted data having the validation information added thereto and stored in the storage media;

decrypts the encrypted data having the validation information added thereto using the second encryption key;

validates the decrypted data using the decrypted validation information; and when the result of the validation is abnormal, displays that abnormality has occurred on a management screen of the management terminal, and wherein the validation information includes a position information of the data write destination included in the write request; and when validating the decrypted data using the validation information, the controller:

displays that abnormality has occurred on the management screen of the management terminal if the information related to the storage position of the encrypted data stored in the storage media and the position information of the write destination of the data included in the decrypted validation information are inconsistent.

2. The storage system according to claim 1, wherein the validation information includes an error-detecting code created by executing a given operation to the data;

when validating the decrypted data using the validation information, the controller:

creates a second validation information by executing the given operation to the decrypted data using the second encryption key; and displays that abnormality has occurred on the management screen of the management terminal if the second validation information and the error-detecting code included in the decrypted validation information are inconsistent.

3. The storage system according to claim 1, wherein the second encryption key is a replica of the encryption key stored in the storage area saved in a given area of the storage media;

the controller stores the second encryption key saved in a portion of the storage media to the storage area when starting the storage system; and when validating the decrypted data using the validation information, the controller uses the second encryption key stored in the storage area to decrypt the encrypted data having the validation information added thereto.

4. The storage system according to claim 3, wherein the controller discontinues a starting process of the storage system if the result of validation is abnormal in the validation of the decrypted data using the validation information.

5. The storage system according to claim 3, wherein the controller re-reads the encrypted data having the validation information added thereto from the storage media if the result of validation is abnormal in the validation of the data decrypted using the validation information; and decrypts the re-read data using the second encryption key, and performs validation using the validation information included in the decrypted re-read data, and if the result of the validation is not abnormal, continues a starting process of the storage system.

6. The storage system according to claim 1, wherein the storage system has a key management server performing backup and/or restoration of the encryption key connected thereto;

the second encryption key is a replica of the encryption key stored in the storage area subjected to back-up in the key management server;

when the controller receives the second encryption key from the key management server, prior to receiving an access request from the host to the storage media, the controller reads the encrypted data having the validation information added thereto and stored in the storage media;

decrypts the encrypted data having the validation information added thereto using the received second encryption key; and performs validation of the decrypted data using the decrypted validation information.

7. The storage system according to claim 6, wherein when performing validation of the decrypted data using the validation information, if the result of the validation is not abnormal, the controller stores the received second encryption key in the storage area.

8. A method for controlling a storage system, the storage system comprising a controller and one or more storage media; wherein a host for reading and writing data in the storage media and a management terminal for performing a management operation of the storage system are connected to the storage system;

the controller has a storage area for storing an encryption key, and when a write request from the host is received, the controller creates a validation information corresponding to data accompanying the write request, adds the validation information to the data, encrypts the data having the validation information added thereto using the encryption key stored in the storage area and stores the same in the storage media;

when a second encryption key is stored in the storage area, prior to receiving an access request to the storage media from the host, the controller:

reads the encrypted data having the validation information added thereto and stored in the storage media;

decrypts the encrypted data having the validation information added thereto using the second encryption key;

validates the decrypted data using the decrypted validation information; and when the result of the validation is abnormal, displays that abnormality has occurred on a management screen of the management terminal, and wherein the validation information includes a position information of the data write destination included in the write request; and when validating the decrypted data using the validation information, the controller:

displays that abnormality has occurred on the management screen of the management terminal if the information related to the storage position of the encrypted data stored in the storage media and the position information of the write destination of the data included in the decrypted validation information are inconsistent.

9. The method for controlling a storage system according to claim 8, wherein the validation information includes an error-detecting code created by executing a given operation to the data;

when validating the decrypted data using the validation information, the controller:

creates a second validation information by executing the given operation to the decrypted data using the second encryption key; and displays that abnormality has occurred on the management screen of the management terminal if the second validation information and the error-detecting code included in the decrypted validation information are inconsistent.

10. The method for controlling a storage system according to claim 8, wherein the second encryption key is a replica of the encryption key stored in the storage area saved in a given area of the storage media;

the controller stores the second encryption key saved in a portion of the storage media to the storage area when starting the storage system; and when validating the decrypted data using the validation information, the controller uses the second encryption key stored in the storage area to decrypt the encrypted data having the validation information added thereto.

11. The method for controlling a storage system according to claim 10, wherein the controller discontinues a starting process of the storage system if the result of validation is abnormal in the validation of the decrypted data using the validation information.

12. The method for controlling a storage system according to claim 8, wherein the storage system has a key management server performing backup and/or restoration of the encryption key connected thereto;

the second encryption key is a replica of the encryption key stored in the storage area subjected to back-up in the key management server;

when the controller receives the second encryption key from the key management server, prior to receiving an access request from the host to the storage media, the controller reads the encrypted data having the validation information added thereto and stored in the storage media;

decrypts the encrypted data having the validation information added thereto using the received second encryption key; and performs validation of the decrypted data using the decrypted validation information.

13. The method for controlling a storage system according to claim 12, wherein when performing validation of the decrypted data using the validation information, if the result of the validation is not abnormal, the controller stores the received second encryption key in the storage area.

* * * * *